United States Patent [19]

Owades

[11] 4,233,334

[45] Nov. 11, 1980

[54] METHOD OF MAKING A BEVERAGE COMPOSITION

[75] Inventor: Joseph L. Owades, Boston, Mass.

[73] Assignee: Norman P. Soloway, Amherst, N.H.; a part interest

[21] Appl. No.: 21,812

[22] Filed: Mar. 19, 1979

Related U.S. Application Data

[63] Continuation-in-part of Ser. No. 798,923, May 20, 1977, abandoned.

[51] Int. Cl.$^2$ ............................................. A23L 2/00
[52] U.S. Cl. .................................... 426/590; 426/456
[58] Field of Search ............... 426/590, 591, 443, 456

[56] References Cited

U.S. PATENT DOCUMENTS

| | | | |
|---|---|---|---|
| 3,023,104 | 2/1962 | Battista | 426/804 X |
| 3,930,053 | 12/1975 | Japikse et al. | 426/590 |
| 3,966,994 | 6/1976 | Kennedy | 426/590 |

*Primary Examiner*—Robert J. Warden
*Attorney, Agent, or Firm*—Strimbeck & Soloway

[57] ABSTRACT

A new and improved fruit flavored, dry, powdered beverage mix adapted to bereconstituted in cold water, and the method of making same is provided. The powdered mix includes beaten cellulose pulp, which imparts an appearance and mouth-feel resembling freshly squeezed natural juice.

11 Claims, No Drawings

METHOD OF MAKING A BEVERAGE COMPOSITION

This application is a continuation-in-part of my co-pending application Ser. No. 798,923, filed May 20, 1977 now abandoned.

This application ralates to a novel beverage composition and to a method of manufacturing same. More particularly, the invention is concerned with a dry powdered beverage mix adapted to be reconstituted by the addition of cold water at the time of consumption to provide a fruit flavored beverage, and to agents for use in the preparation of a beverage mix of the aforesaid type, for improving palatability of the reconstituted beverage.

A number of dry powdered beverage mixes adapted to be reconstituted in cold water to produce orange flavored juice-like beverages are presently manufactured, available commercially under various trademarks, including START and TANG (both available from General Foods Corporation), BORDEN (available from Borden, Inc.), ANN PAGE (available for A&P Stores), and PANTRY PRIDE (available from Pantry Pride Stores), and described in the patent literature (see U.S. Pat. No. 3,023,106 to James L. Common and U.S. Pat. No. 3,397,063 to Paul O. Carlson and Elmer W. Michael). While such products generally are considered to be of excellent nutritional value and may also offer advantages over fresh or frozen juice in terms of storage and convenience in use, currently available dry powdered juice flavored beverage mixes are considered by many people to not resemble natural juice either in appearance or mouth-feel. (The term "mouth-feel" is a term of art in the food and beverage industry and is intended to signify a perceived sensation on the tongue and other inner surfaces of the mouth pertaining to tactile and/or other physical stimuli such as viscosity, insoluble matter or particle size.)

Common comsumer complaints about currently commercially available dry powdered juice flavored beverage mixes (when reconstituted in cold water) include: (1) that the beverages have an excessive sweetness as compared with natural juice, (2) that the reconstituted beverages are generally thin, i.e. lack body, as compared with natural juice, and (3) the lack of pulp in the reconstituted beverages. These differences in appearance, taste and texture as compared with natural fresh squeezed orange juice or reconstituted frozen orange juice have had an adverse effect on the consumer acceptance of such products.

U.S. Pat. No. 3,023,104 to Orlando A. Battista teaches the addition of a product of the acid-hydrolysis of cellulose, said product having an average degree of polymerizaton of 15 to 375 anhydroglucose units, to foods such as gravies, sauces, jellies, jams, preserves, molasses, beverages and the like, to provide a thickening agent to such foods. Battista also reports that conventional fibrous cellulose has been used as a bulking agent, but has the "great defect" of an objectionable texture. According to Battista, only the aforesaid acid-hydrolysis products of cellulose are suitable, since, when conventional fibrous cellulose is mixed with a food or food ingredient and the mixture tasted, it is noticeable per se to the taste, is not smooth, has a fibrous mouth-feel when chewed, gives the impression of the presence of an additional insoluble or residual substance and tends to accummulate in the mouth. Battista also notes that the unsatisfactory texture of the fibrous material cannot be remedied no matter how small the fibers are cut.

It is thus a principal object of the present invention to provide a novel dry, powdered beverage mix which can readily be reconstituted in cold water, and which possesses a close resemblance in appearance, taste and texture, upon reconstitution in cold water, with natural freshly squeezed orange juice. It is also an object of the present invention to provide a method for preparing the foregoing product.

These and other objects of the present invention are achieved by providing a dry powdered beverage mix which comprises, in addition to the usual principal ingredients of suger, citric acid, potassium or calcium phosphate, modified food starches, vegetable gums and oils and natural and artificial colors and flavors, 0.7 to 15 weight percent of dry beaten cellulose pulp. Preferably, the beaten cellulose pulp is added to the powdered beverage mix in an amount in the range of 1.5 to 7%, preferably 3.0–4.0% (all percentages by dry weight). The pulp additive is formed by beating an aqueous slurry of cellulose pulp to a relatively high degree of freeness, e.g. as for greaseless or glassine type paper. Preferably the pulp is beaten to a freeness of about 25–500 (Canadian Standard). The beaten cellulose pulp is treated to remove excess water, e.g. as by filtering or centifuging, and the pulp is dried, preferably in contact with a particulate edible solid such as granular or powdered sugar, citric acid, corn syrup solids, or mixtures thereof, and the dried pulp then is dry mixed with the other ingredients to form the powdered beverage mix. Drying the pulp by mixing and drying in contact with particulate edible solids such as sugar has been found to assure ready re-dispersion of the beaten pulp when the beverage mix is reconstituted in cold water. In a preferred embodiment of the invention excess water is removed by filtering, and the resulting filter cake is mixed with and dried in contact with 1 to 5 parts by weight of dry powdered sugar (sucrose or fructose). Commercially available beverage mixes contain sugar as a major ingredient; therefore, it is a simple matter to adjust for any sugar added to dry the pulp.

An unusual and interesting feature of the present invention is the ability of beaten cellulose pulp to substantially change the mouth-feel, appearance and texture of the beverage mix upon reconstitution with water. Particularly, in accordance with the present invention, only beaten cellulose pulp having a freeness of less than about 500 (Canadian Standard) has been found to provide the desired results. Moreover, that the addition of beaten cellulose pulp of the aforesaid degree of freeness is responsible for the unique consequences achieved is quite clear, inasmuch as beverage compositions prepared from the same combination of ingredients but substituting finely cut or shreaded unbeaten pulp, or pulp beaten less, failed to provide comparable results.

The following examples, illustrative of the principals of the present invention, are based upon the addition of dry cellulose pulp to a powder beverage mix made in accordance with the example in Carlson et al U.S. Pat. No. 3,397,063. (The latter product is believed to be the product TANG which is available from General Foods Corporation).

The basic procedure is to beat cellulose pulp in water until a desired degree of freeness is achieved. The cellulose pulp is then press filtered to remove excess water, or the pulp may be drained on a wire, and the filter cake comprising the beaten pulp is then mixed with an equal weight of dry powdered sugar, and pulp/sugar mixture is air dried to form a dry cake mixture. The resulting dried cake mixture is then crushed to a powder (mesh size 100), and the resulting dry powder mixture is dry mixed with additional sugar, and the other ingredients in accordance with the teachings of the Example of Carlson et al U.S. Pat. No. 3,397,063, supra. The resulting mix is then reconstituted in cold water, stirred for 30 seconds, and the resulting reconstituted beverage submitted to a taste panel for double blind test tasting.

EXAMPLE I (A) Normal composition—A dry beverage mix was prepared following the Example of Carlson et al U.S. Pat. No. 3,397,063. Four teaspoons of the resulting dry beverage mix were mixed with 8 ounces of cold water, and the resulting mixture was stirred for 30 seconds.

(B) Finely cut pulp—Finely cut cellulose pulp (mesh size 100) is intimately mixed with dry beverage mix (A) to form a mixture containing 3.5 weight percent pulp. Four teaspoons of the resulting mixture are added to 8 ounces of water. Stir for 30 seconds as before.

(C) Unbeaten pulp—Shreaded unbeaten cellulose pulp is intimately mixed with dry beverage mix (A) to form a mixture containing 3.5 weight percent pulp. Four teaspoons of the resulting mixture are added to 8 ounces of water. Stir for 30 seconds as before.

(D) Beaten cellulose pulp—Step 1: Prepare beaten cellulose pulp by mixing 60 grams of cellulose pulp in 1000 gm. of water. Beat the pulp to a freeness of about 100 (Canadian Standard freeness). Press filter the beaten pulp to express excess water, and then mix the resulting filter cake with 240 grams of dried sucrose. Allow the pulp/sucrose mixture to air dry at room temperature. Grind the resulting dried mixture of pulp and sucrose to break up clumps, and put the mixture aside.

Step 2: Prepare a 2000 gram batch of dry beverage mix in accordance with the Example of U.S. Pat. No. 3,397,063, supra, but with the following change: Reduce the amount of granulated sugar in the mix by 240 grams. Dry mix the resulting beverage mix with the beaten cellulose/sucrose from Step 1 to form a mixture containing approximately 3 weight percent pulp. 4 teaspoons of the resulting mixture from Step 2 are added to 8 ounces of cold water. Stir for 30 seconds.

Results: All beverages had approximately the same orange color. The unmodified beverage drink had a candy-like, sweet orange flavor and an orange aroma, a thin body and no hint of pulp.

The beverage drinks modified by the addition of finely cut- or shreaded-unbeaten pulp had candy-like, orange flavor and orange aroma, and visual appearance resembling the presence of pulp. However, the resulting beverages were judged relatively thin as compared with fresh squeezed juice, and as having a gritty taste. All panelists preferred the unmodified product over that modified by the addition of finely cut- or shreaded-unbeaten pulp.

The beverage drink modified by the addition of beaten pulp had a sweet orange flavor and aroma. This product also had a visual appearance resembling the presence of uulp. The cellulose pulp fibers appeared suspended in the beverage, and the fibers had a slight orange color and orange taste, and a texture resembling that of natural orange juice pulp. All taste testers preferred the beverage containing the beaten cellulose pulp to the unmodified product as most closely resembling freshly squeezed natural orange juice.

EXAMPLE II

The purpose of this example is to show how taste and texture of the reconstituted dry beverage mix varies with the amount of beaten cellulose pulp included in the dry mixture. The following dry powdered mixtures were prepared following the general procedure of Example 1(c) (all weights by net dry weight):

0.7 gm. beaten cellulose in 100 gm. dry powdered mix.

3.5 gm. beaten cellulose in 100 gm. dry powdered mix.

15 gm. beaten cellulose in 100 gm. dry powdered mix.

Each mixture was reconstituted in cold water as before, and subjected to double blind testing.

Results: Increasing the amount of beaten cellulose in the dry powdered mix improves the taste and texture of the reconstituted beverage. Adding as little as about 0.7 wt.% of beaten cellulose (dry weight) to the dry mixture improves the taste and texture of the reconstituted beverage. Addition of about 15 wt.% of beaten cellulose (dry weight) renders the reconstituted beverage excessively thick for most panelists' tastes.

As appears clearly from the foregoing, adding beaten cellulose pulp of freeness of less than about 500 (Canadian Standard) to dry fruit flavored beverage mixes offers a novel dry fruit flavored beverage mix which, when reconstituted in cold water, has a flavor and texture resembling freshly squeezed orange juice.

Since certain changes may be made in the above process and products without departing from the scope of the invention herein involved, it is intended that all matter contained in the above description shall be interpreted in an illustrative and not in a limiting sense.

What is claimed is:

1. In a method of manufacturing fruit flavored, dry powdered beverage mix adapted to be reconstituted in water, admixing with said dry powdered mix at least about 0.7 weight percent of dry beaten cellulose pulp of Canadian Standard freeness of less than about 500, said dry cellulose pulp being derived by beating cellulose in water to said degree of freeness, removing excess water, and drying the resulting beaten pulp in contact with a particulate edible solid.

2. In a method according to claim 1 wherein said pulp is dried in contact with a particulate edible solid selected from the group consisting of sugar, citric acid, corn syrup solid, and mixtures of two or more of the aforesaid group.

3. In a method according to claim 1 wherein said pulp is dried in contact with sugar.

4. In a method according to claim 1 wherein said pulp is beaten to a Canadian Freeness in the range of 25 to 500.

5. In a method according to claim 1 wherein up to 15 weight percent of said dried pulp is mixed with said dry powdered mix.

6. A method of enhancing the taste and texture of a fruit flavored, dry powdered beverage mix of the type adapted to be reconstituted in water, said method comprising adding to said dry powdered mix 0.7 to 15 weight percent of dry beaten cellulose pulp of Canadian Standard Freeness of less that 500; said dry beaten cellulose pulp being derived by beating cellulose in water to said degree of freeness, removing excess water, and drying the resulting beaten pulp in contact with particulate edible solid.

7. In a method according to claim 6 wherein said particulate edible solid is selected from the group consisting of sugar, citric acid, corn syrup solid, and mixtures of two or more of the aforesaid group.

8. In a method according to claim 6 wherein said beaten pulp is dried in contact with 1 to 5 parts by weight of sugar.

9. In a method according to claim 6 wherein said pulp is beaten to a Canadian Freeness in the range of 25 to 500.

10. In a method according to claim 6 wherein 1.5 to 7 weight percent of said dried beaten pulp is added to said dry powdered mix.

11. In a method according to claim 6 where 3-4 weight percent of said dried beaten pulp is added to said dry powdered mix.

* * * * *